April 10, 1945.  J. R. SNYDER  2,373,508
SHOCK ABSORBER
Filed Feb. 7, 1941  3 Sheets-Sheet 1
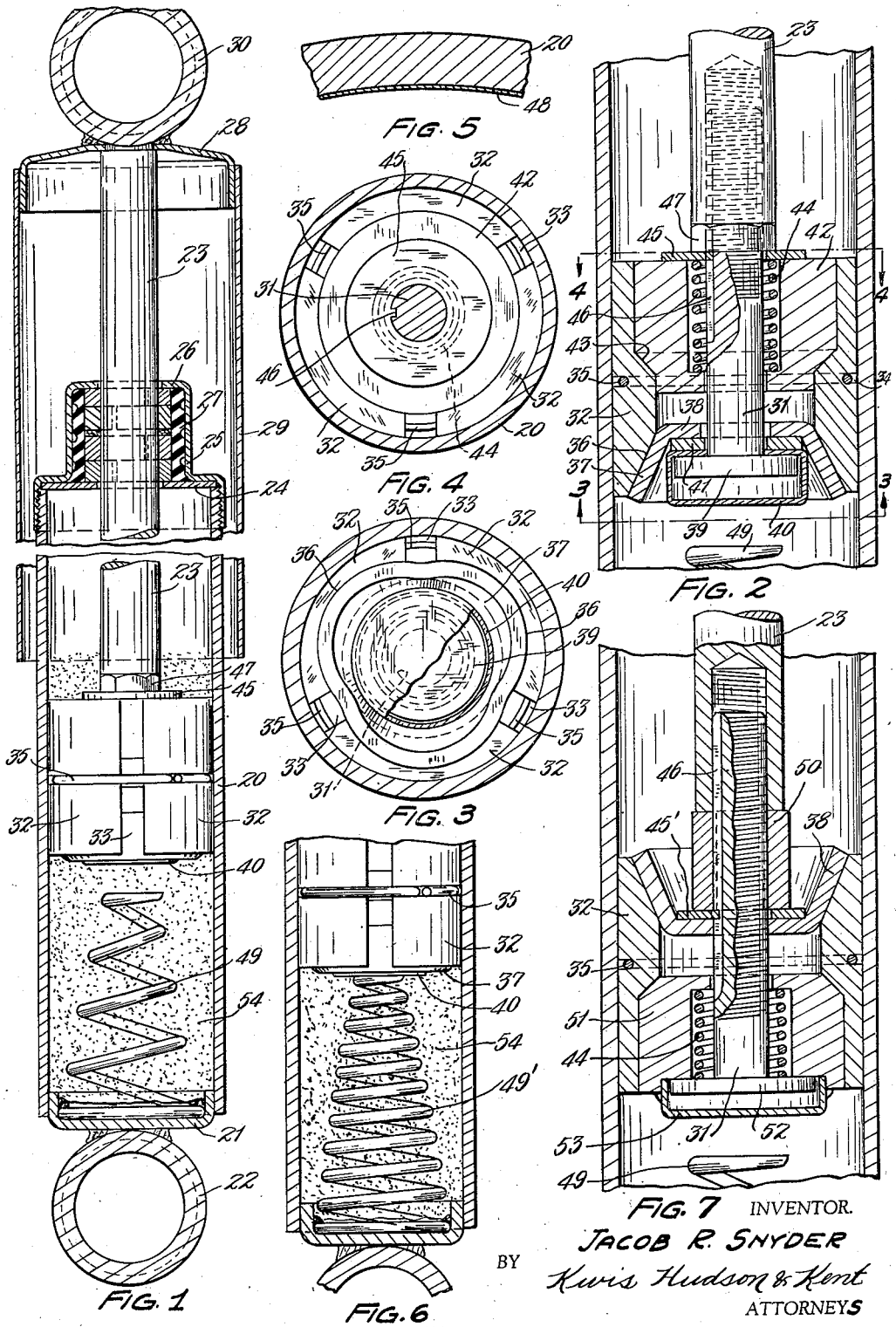
INVENTOR.
JACOB R. SNYDER
BY Kwis Hudson & Kent
ATTORNEYS

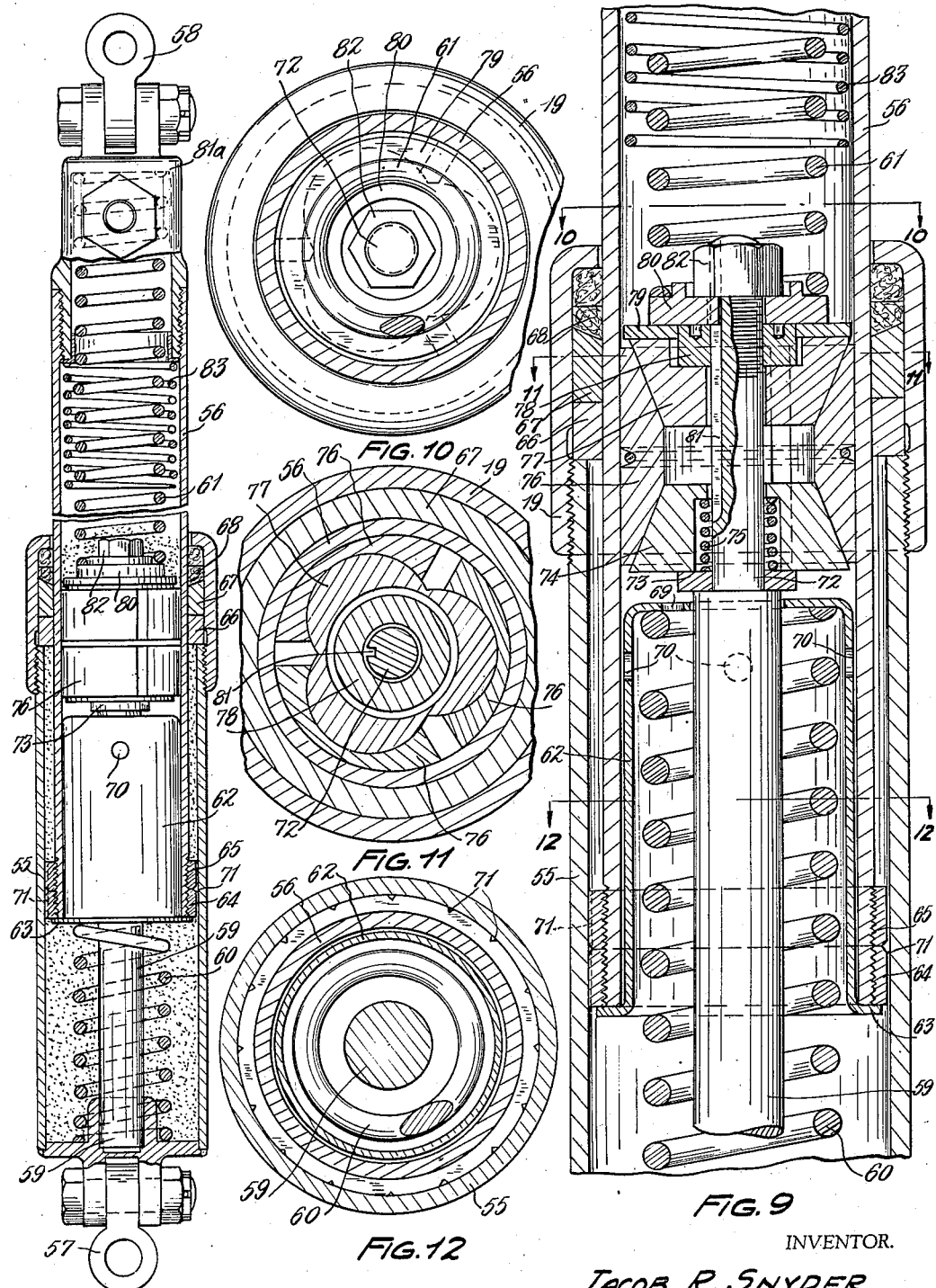

April 10, 1945.   J. R. SNYDER   2,373,508
SHOCK ABSORBER
Filed Feb. 7, 1941   3 Sheets-Sheet 3
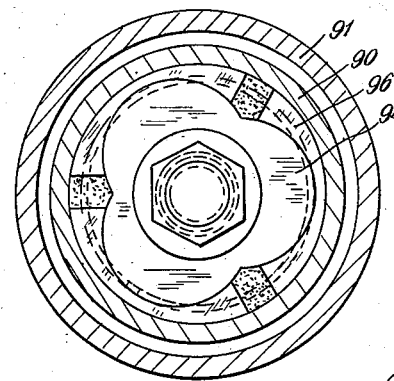
Fig. 15
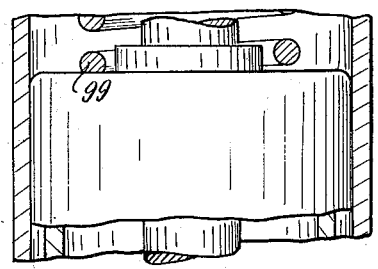
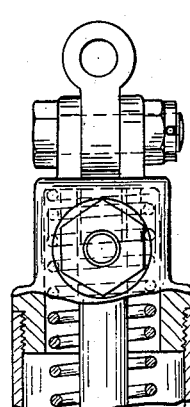
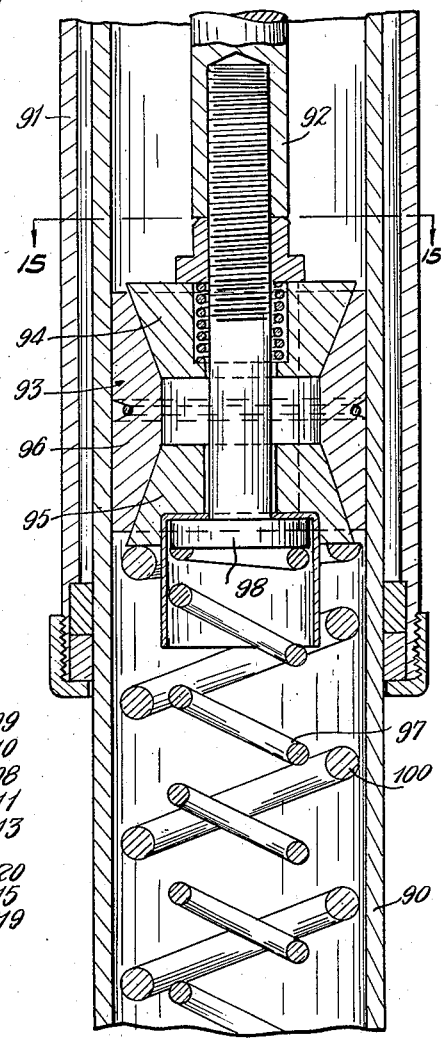
Fig. 14
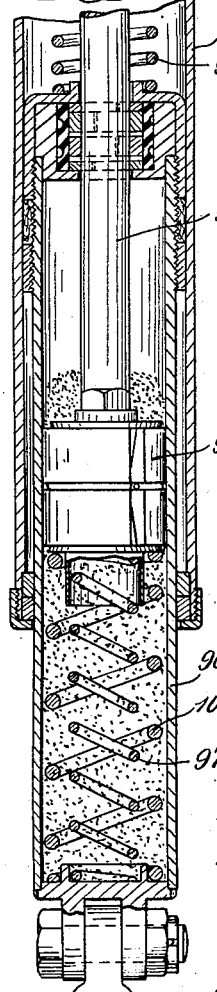
Fig. 13
Fig. 16
INVENTOR.
JACOB R. SNYDER
BY Kwis Hudson & Kent
ATTORNEYS Patented Apr. 10, 1945

2,373,508

UNITED STATES PATENT OFFICE 2,373,508

SHOCK ABSORBER

Jacob Rush Snyder, Cleveland, Ohio, assignor to Thompson Products, Inc., Cleveland, Ohio, a corporation of Ohio Application February 7, 1941, Serial No. 377,891

15 Claims. (Cl. 267—9)

This invention relates to improvements in shock absorbers, and has reference particularly to shock absorbers of the friction type for use on vehicles and airplanes.

One of the objects of the invention is the provision of means for reducing to a minimum the initial effort required to get the friction unit in motion, or rather to reduce the difference between the initial effort and the effort required to maintain the motion. The opposition to initial movement, particularly where a lubricating powder is used instead of oil, increases ordinarily with the use of the shock absorber. I have found this to be due to tiny particles of metal which are worn or broken off the cylinder wall and mixed with the lubricating powder. The quantity of these fine particles or shreds of metal mixed with the powder increases steadily with the use of the shock absorber and increases proportionately the tendency of the friction member to stick, with the result that the characteristics of the shock absorber are modified considerably. This difficulty is overcome in the present invention by the provision of a cylinder wall surface which is both smooth and hard, although economically produced. I accomplish this result by using for the cylinder tubing as it comes from the manufacturer, that is without grinding or honing, and coating it interiorly with chromium to a depth sufficient to produce a hard as well as a corrosion resistant surface. The grain of the tube metal runs lengthwise and hence has no fine or microscopic grooves running annularly, such as may be produced by a grinding or honing operation. Additionally the chromium coating results in a very hard surface. The movement of the friction head is lengthwise of the cylinder and therefore there is no rubbing at right angles to metal grain or finishing marks. Furthermore the chromium coating presents a surface so hard that whatever wear there may be will take place in the friction head, which is preferably non-metallic, and not in the chromium.

Another object of the invention is the provision of coil spring means having the function of taking a portion of the load on the compression stroke with additional functions of actuating a sleeve expander and of agitating a mass of lubricating powder to prevent possible caking of the latter.

Still another object is to provide in the piston an inertia member adapted to momentarily increase the friction effect of the piston in response to sudden shocks.

A further object is the provision of means for adapting the invention to use in an airplane strut or tail wheel shock absorber, where the device must support a considerable load in addition to its function of absorbing shock.

Another object is to provide adjustable means for limiting the degree of friction which may be exerted.

Other objects and features of novelty will appear as I proceed with the description of those embodiments of the invention which, for the purposes of the present application, I have illustrated in the accompanying drawings, in which Fig. 1 is an elevational view, principally in central longitudinal section, of an automobile type shock absorber embodying the invention.

Fig. 2 is a fragmental sectional view of the same on a larger scale.

Figs. 3 and 4 are cross sectional views taken substantially on the lines 3—3 and 4—4, respectively, of Fig. 2.

Fig. 5 is a sectional view on an exaggerated scale of a fragment of the cylinder wall showing a hard metallic coating which constitutes a part of my invention.

Fig. 6 is a fragmental sectional view showing a modification of the Fig. 1 construction.

Fig. 7 is a view similar to Fig. 2 showing a different arrangement of piston parts.

Fig. 8 is an elevational view, principally in central longitudinal section, of an airplane strut or tail wheel shock absorber embodying the invention.

Fig. 9 is a fragmental view of the same on a larger scale showing the piston and certain other parts in section.

Figs. 10, 11 and 12 are cross sectional views taken substantially on the lines 10—10, 11—11 and 12—12 of Fig. 9.

Fig. 13 is a view similar to Fig. 8, showing a different modification.

Fig. 14 is an enlarged sectional view of a portion of the construction shown in Fig. 13.

Fig. 15 is a cross sectional view taken substantially on the line 15—15 of Fig. 14.

Fig. 16 is a fragmental sectional view of still another modification.

Referring first to Figs. 1 to 6 inclusive, 20 represents a cylinder which is closed at its lower end by a plug 21 to which is welded a ring 22 that constitutes means for attachment to one of two elements whose relative movements are to be cushioned, as for example to an axle of an automobile.

A rod 23 in the nature of a piston rod projects into the opposite end of the cylinder. Its movement must be guided so that it may be axially aligned with the cylinder at all times. As here disclosed guiding means is mounted on the upper end of the cylinder. A plate 24 with a central opening large enough to clear the piston rod is placed over the open end of the cylinder and is locked in position by a collar 25 that is threadably mounted upon the cylinder. This collar has an intermediate annular shoulder in engagement with the plate 24 and an end shoulder 26 which also clears the piston rod. A resilient sleeve 27 is mounted within collar 25, and inside this sleeve there are a plurality of split guide rings which receive the piston rod with a sliding fit.

The outer end of the piston rod may have a shoulder to receive an opening in a sheet metal cap 28 from which depends a relatively large cylindrical apron 29 that functions as a protecting guard. Beyond the cap 28 rod 23 is welded to a ring 30, similar to ring 22, the ring 30 being adapted to be connected with the other of two elements whose relative movements are to be cushioned.

Referring now more specifically to Fig. 2, it will be noted that the lower end of piston rod 23 comprises a separate piece 31 which is of smaller diameter and which is threaded into an axial socket provided in the part 23. Before this is done however the piston is built up of the following parts. A series, preferably three, non-metallic friction shoes 32 constitute a friction sleeve with vertical passages 33 between the individual shoes, and each is provided about mid-way of its length with a groove 34 through which runs a split ring 35 of spring wire which tends to contract the sleeve. The nature of these shoes 32 is more specifically dealt with in my copending applications Serial Nos. 230,469 and 298,474, filed September 17, 1938, and October 7, 1939, respectively, now Patent No. 2,237,318 and No. 2,237,319, granted April 8, 1941.

Each of the shoes 32 has a cavity 36 at one end formed as an inclined cylindrical surface which is engaged by a correspondingly shaped lobe 37 on a metal expander 38. The movement of this expander in an upward direction in Fig. 2 results in a small movement of the shoes 32 radially outward and the exertion of pressure by the shoes against the cylinder walls thereby increasing the friction and resisting axial movement of the piston and cylinder relative to each other. The expander 38 has a central opening large enough to clear the extension 31 of the piston rod. The latter is provided with a flat head 39 which is enclosed by a loose cap 40 of rigid metal having an inturned flange engaging the upper or rear side of the head 39. Between this flange and the flat metal portion of expander 38 there is a washer 41.

A relatively heavy inertia member 42 surrounds extension 31. It has a beveled shoulder 43 which engages a correspondingly beveled surface on the shoes 32. Member 42 is counterbored as shown, to take a coil spring 44 that bears at one extremity against the end of the counterbore and at the other extremity against a washer 45 that overlaps the member 42 and that has an inwardly extending lip that runs in a longitudinal groove 46 in extension 31. A nut 47 is threaded onto the extension 31 and is caused to bear through washer 45 against spring 44 and inertia member 42. Hence, as the nut 47 is tightened down, inertia member 42 and expander 38 are drawn toward each other, thereby putting an initial pressure on the shoes 32 in a radially outward direction. When all of the piston parts have been thus assembled upon the extension 31 the latter is threaded tightly into the socket in the end of piston rod 23.

Cylinder 20 is cut from a length of steel tubing, the internal diameter of which in manufacture is kept within close limits. The inner wall of the tube section in accordance with my invention is covered with a hard metallic coating. Chromium electroplated to a depth sufficient to provide such a coating is the treatment I prefer to employ. This coating is indicated at 48 in Fig. 5 of the drawings.

A coil spring 49 anchored in the end cap 21 of the cylinder projects upwardly therefrom to a point somewhat beneath the piston in the inactive or neutral position of the shock absorber, this position being illustrated in Fig. 1. Fig. 6 shows the same construction as Fig. 1 except that spring 49' is long enough to engage cap 40 in the neutral position of the parts and hence becomes effective earlier in the compression stroke than does the spring 49.

The piston illustrated in detail in Fig. 2 is designed for use in the cases where the principal function of the shock absorber is to cushion the recoil or rebound stroke. In cases where its function is largely to assist the springs of the vehicle in absorbing the shock of compression strokes, the construction of Fig. 7 may be employed. The essential difference is that in Fig. 7 the expander and the inertia member are in interchanged positions as compared with Fig. 2. The shoes 32 constituting the expansible sleeve may be identical with the shoes of Fig. 2, but they are inverted. The expander 38 may also be identical, and merely inverted as to position. The washer 45' similar to washer 45 of Fig. 2 is prevented from rotation by means of a lip which extends into the groove 46 of the rod extension 31, as in the Fig. 2 construction. A relatively long nut 50 is threaded onto the extension 31 and constitutes means for drawing the expander toward the inertia member 51 against the action of coil spring 44, which thereby places the shoes under an initial pressure. The head 52 of the extension bears against the bottom of the inertia member and is enclosed by a metal cap 53 which may be welded to the inertia member. This cap is adapted to be engaged by spring 49 during the compression stroke. As in my previous applications above identified I employ lubricating powder, which is indicated herein at 54. It can flow freely through the passages 33 in the expander sleeve, and it is agitated by the spring 49 which assists in keeping it aerated and free from packing.

The functioning of that form of the invention which is illustrated in Figs. 1 to 6 inclusive is as follows. When a wheel of a vehicle using these shock absorbers strikes an obstruction the cylinder 20 rises rapidly, so that the piston descends relatively. In its rapid movement downwardly the expander 38 relieves the pressure on shoes 32, leaving the piston comparatively free in the cylinder so that it moves without material friction until the cap 40 strikes the spring 49. The spring 49 thereupon gradually assumes some of the load, but at the same time it pushes the expander 38 upwardly, thereby forcing the shoes 32 upwardly, increasing the friction and retarding the compression stroke. On the rebound the head 39 of the piston rod exerts a pull upwardly on the expander 38 and causes the spreading of shoes 32. This latter action is quite positive in character and has a sharp recoil absorbing tendency.

During the travel of the vehicle over a comparatively smooth pavement the movements of the shock absorber are relatively short and not such that the spring 49 comes into play. The movements on such ordinary operation are relatively free on compression while the recoil is snubbed or checked sufficiently.

One function of the inertia member 42 is to maintain the shoes 32 in parallel relation to the cylinder walls, that is to prevent their being tilted by the action of the expander 38. The beveled surface 43 assists in this function. The inertia member also assists in absorbing shocks, since it tends to lag behind and to provide a yielding opposition to sudden movements of the expander 38.

In the case of the Fig. 7 construction the expander works immediately upon the beginning of a compression stroke to exert a friction effect cushioning the stroke. If the stroke proceeds far enough spring 49 is also compressed and absorbs part of the shock. On the rebound the friction is less and the movement easier in comparison.

Referring next to Figs. 8 to 12 inclusive, wherein I have shown an application of the invention to an airplane strut or shock absorber, 55 and 56 are telescoping cylinders with connections 57 and 58 for attachment to the parts whose relative movements are to be cushioned. The end wall of cylinder 55 carries a piston rod 59 which projects centrally into cylinder 56. On its inner extremity this rod carries a piston which is adapted to frictionally engage cylinder 56 with a varying effort, whereby the shocks of compression and recoil may be checked. This device, as is usual in airplane struts, is designed to carry the load of the plane. There are two coil springs for this purpose, a lower spring 60 and an upper spring 61. Spring 60 bears on the outer end of cylinder 55 and on the inner end or head of a spring cage 62. The force of the spring is transmitted to the cylinder 56 through the intermediacy of this cage, that is the cage has a flange 63 at its lower extremity which engages beneath the lower extremity of cylinder 56. Bearing rings 64 and 65 at the lower end of cylinder 56 serve to center and guide the two cylinders, as does also ring 66 at the inner end of cylinder 55, this latter ring being enclosed by a threaded collar which holds in addition a packing gland 67 and a packing 68. The cage 62 has ports 69 and 70 therethrough to permit lubricating powder to circulate, while rings 64 and 65 have longitudinal grooves 71 therein for a similar purpose.

The upper end of piston rod 59 is reduced as shown at 72. On this reduced end there is a washer 73, above which there is an expander member 74 that is similar in function and in outer contour to the expander 38, and is provided with a counterbore for the reception of a coil spring 75. A plurality of friction shoes 76 similar in function to the shoes 32 surround expander 74 and another expander 77 which is in inverted relation. The latter expander has a counterbore in its upper side in which is received a nut 78 having spanner wrench holes in its upper surface. A washer 79 surrounds nut 78, and a further lock washer 80 with a lip extending into a groove 81 in the piston rod overlies nut 78 and washer 79. A nut 82 is screwed down onto the threaded end of rod extension 72 and holds the piston parts in adjusted position while putting spring 75 under initial tension. One end of spring 61 rests against the upper surface of washer 80, while the other end engages the end cap 81a of cylinder 56. It will be apparent therefore that part of the load may be transmitted through spring 61 to the piston and hence through piston rod 59 to the mounting ring 57 and the running gear of the airplane, while the remaining portion of the load is transmitted through cylinder 56 to cage 62 and thence through spring 60 to the bottom of the shock absorber. The spring 61 may be omitted in some cases. A spring 83 surrounds spring 61 and bears at its upper end against an internal shoulder on the cylinder 56, as shown in Fig. 8 of the drawings. On intense compression shocks, as for example during the landing of an airplane, the lower end of this spring engages washer 79, which communicates spring pressure to expander 77, whereby the shoes 76 are forced into closer frictional engagement with the cylinder walls. Similarly upon rebound when the upward movement of the cylinder 56 relieves the load on spring 60, that spring will raise spring cage 62 into engagement with expander 74, thereby pressing the shoes 76 outwardly and checking the recoil action.

Figs. 13, 14 and 15 illustrate a modification wherein two telescoping cylinders 90 and 91 are used, the piston rod 92 in this case being attached to the upper cylinder and carrying a piston 93 which runs in the lower cylinder 90. It has expanders 94 and 95 and friction shoes 96 similar in construction and operation to the corresponding parts in Fig. 9. A coil spring 97 bears against the lower end of the smaller cylinder and against the head 98 of the piston rod, so that this spring is enabled to support part of the load impressed upon the shock absorber. A further part is absorbed by a spring 99 which bears against the inner end of cylinder 90 and the outer end of cylinder 91.

A further spring 100 encircles spring 97, bearing at its lower end against the lower end of cylinder 90 and at its upper end bearing against expander 95 some or all of the time, that is to say it may bear against the expander when the airplane is at rest on the ground or it may be of a shorter length such that it will not touch the expander until the compression stroke gets under way. In any event landing shocks are taken by the springs 99 and 97 and to some extent by spring 100, and also by the friction between the piston and the cylinder. Rebound shocks are taken by the piston alone.

Fig. 16 shows a modification of the construction illustrated in Figs. 8 and 9. Spring 105 is similar in function to spring 60, and cage 107 is like cage 62. The upper inner cylinder is shown at 108. Spring 109 is welded at its lower end to a washer 110 which is slidable upon the external surface of a nut 111 that is threaded upon the constricted part of piston rod 112. Washer 110 engages upper expander 113. Spring 109 in the neutral position of the parts stops short of the top of the cylinder, and hence becomes effective only after the normal compression stroke begins. As soon as compression of this spring takes place it moves expander 113 downwardly to put radial pressure on shoes 114 and thereby increases the friction effect. The lower expander 115 is counterbored to receive a spring 116 for exerting pressure to expand shoes 114 initially and also a heavier spring 117 that is not normally flexed. Both of these springs bear at their lower ends against a washer 118 loose upon piston rod 112 and normally seated against a shoulder on that rod. A sleeve 119 is threaded onto the rod to form a stop and is locked in position by a second threaded sleeve 120.

The above described construction is for the purpose of limiting the action of the expander 115 on the rebound stroke. During this stroke the upper end of cage 107 strikes washer 118 and operates through spring 117 to raise expander 115. The extent of this movement is limited by the stop sleeve 119 engaging the washer 118. The degree of expansion of the friction shoes possible on the rebound stroke may be regulated by adjustment of the stop sleeve 119.

It should be understood that in all of the embodiments herein disclosed the hard metallic coating illustrated in Fig. 5 is to be used on the cylinder wall against which the friction shoes bear. This coating being extremely thin, it is impractical to show it in anything approaching proper scale in the other figures of the drawings.

Obviously the present invention is not restricted to the particular embodiments thereof herein shown and described. Moreover it is not indispensable that all of the features of the invention be used conjointly, since they may be employed advantageously in various combinations and sub-combinations.

Having thus described my invention, I claim:

1. In a friction shock absorber, a casing, an expansible unit axially movable in the casing and embodying means for expanding the same into frictional engagement with the wall of the casing, a lubricating powder in the casing, and a spring in the casing adapted to be compressed during relative axial movement between said unit and casing and to agitate said powder to maintain the same in a relatively loose state.

2. In a friction shock absorber, an elongated metal casing, an expansible unit axially movable in said casing and comprising a non-metallic sectional sleeve formed of relatively hard material and a tapered expander also formed of relatively hard material and disposed in said sleeve for expanding the same into frictional engagement with the wall of the casing, said wall having a hard metallic coating thereon providing the same with a relatively smooth wear- and abrasion-resistant surface with which said sleeve slidably cooperates, and a quantity of lubricating powder in a relatively loose state in said casing, said metallic coating also serving to prevent shedding of metallic particles from said casing into said powder.

3. In a friction shock absorber, an elongated tubular casing, a reciprocable actuating rod extending into the casing, a lobular expander carried by said rod, an expansible sleeve slidable in said casing and having flutes engaged by the lobes of the expander, and an inertia body in the casing arranged to cause relative movement between the expander and sleeve for forcing the latter into frictional engagement with the wall of said casing.

4. In a friction shock absorber, an elongated tubular casing, a reciprocable actuating rod extending into the casing, an expansible sleeve slidable in said casing and having a fluted opening, a tapered lobular expander carried by said rod and engaging in said fluted opening and adapted to expand the sleeve into frictional engagement with the wall of the casing upon relative axial movement between the sleeve and expander, and an inertia body carried by said rod and adapted, upon sudden relative movement between said casing and rod, to produce such relative axial movement between said sleeve and expander.

5. In a friction shock absorber, an elongated tubular casing, a reciprocable actuating rod extending into the casing, an expansible sleeve slidable in said casing and having a fluted opening, a tapered lobular expander carried by said rod and extending into one end of said sleeve and adapted to expand the same into frictional engagement with the wall of the casing upon relative axial movement between the sleeve and expander, and an inertia body axially shiftable on said rod and engageable with the other end of said sleeve, said body being adapted to cause such relative axial movement between the sleeve and expander in response to sudden relative movement in one direction between the rod and casing.

6. In a friction shock absorber, an elongated tubular casing, a reciprocable actuating rod extending into the casing and having spaced shoulders thereon, an expansible sleeve slidable in said casing and having a fluted opening therein, a tapered lobular expander on the rod adjacent one of said shoulders and engaging in one end of the sleeve to expand the same into frictional engagement with the wall of the casing upon relative axial movement between the sleeve and expander, and an inertia body on the rod adjacent the other of said shoulders and engaging in the other end of said sleeve, said body being shiftable on said rod and away from said second shoulder to cause expansion of the sleeve upon sudden relative axial movement between the rod and casing in one direction.

7. In a friction shock absorber, an elongated tubular casing a reciprocable actuating rod extending into the casing and having spaced shoulders thereon, an expansible sleeve slidable in said casing and having a fluted opening therein, a tapered lobular expander on the rod adjacent one of said shoulders and engaging in one end of the sleeve to expand the same into frictional engagement with the wall of the casing upon relative axial movement between the sleeve and expander, an inertia body on the rod adjacent the other of said shoulders and engaging in the other end of said sleeve, said body being shiftable on said rod and away from said second shoulder to cause expansion of the sleeve upon sudden relative axial movement between the rod and casing in one direction, and a spring between said second shoulder and body acting to produce an initial expansion of said sleeve.

8. In a friction shock absorber, a cylinder member adapted to be connected with one of a pair of relatively movable parts, a rod adapted to be connected with the other of said parts and extending axially of said cylinder member, a resistance unit connected with said rod and reciprocable in the cylinder member, said unit comprising an expansible sleeve and an expander for expanding the sleeve into frictional engagement with the wall of the cylinder member upon relative axial movement between said sleeve and expander, a load-carrying spring in the cylinder member in engagement with said resistance unit and adapted to retard axial movement of said unit in one direction, and a second spring in said cylinder member adapted to be compressed by such axial movement of said unit and to react on the unit to expand the same.

9. A friction shock absorbing structure comprising a tubular casing, an actuating rod extending axially of said casing, a resistance unit connected with said rod and comprising an expansible sleeve and expanders cooperating with opposite ends of the sleeve for expanding the same into frictional engagement with the wall of the casing, springs in the casing on opposite sides of the friction unit, one spring being adapted to be compressed by said unit and to react thereon to expand the same during relative axial movement of the unit in one direction, and means enabling the other spring to react on said unit to expand the same during relative axial movement of the unit in the other direction.

10. A shock absorbing structure, comprising a pair of telescoping cylinder members adapted for connection respectively with a pair of relatively movable parts to be retarded, a resistance unit connected with one of said cylinder members and relatively slidable in the other, said unit comprising an expansible sleeve and expanders cooperating with opposite ends of the sleeve to expand the same into frictional engagement with the wall of said other cylinder member, a load-carrying spring in one cylinder member in engagement with said resistance unit and adapted to retard axial movement of said unit in one direction, a second spring in said one cylinder member adapted to be compressed by relative axial movement of said unit in said one direction and to react on the unit to expand the same, a third spring in the other cylinder member, and means enabling said third spring to react on said unit to expand the same during relative axial movement of the unit in the other direction.

11. A shock absorbing structure, comprising a pair of telescoping cylinder members adapted for connection respectively with a pair of relatively movable parts to be retarded, a resistance unit connected with one of said cylinder members and relatively slidable in the other, said unit comprising an expansible sleeve and an expander cooperating with the sleeve to expand the same into frictional engagement with the wall of said other cylinder member, a spring in said one cylinder member, and a cage between said other cylinder member and said spring for compressing the latter during relative axial movement of said other cylinder member in one direction, said cage being engageable with said unit for expanding the same during relative axial movement of said other cylinder member in the opposite direction.

12. In a shock absorber, a pair of relatively slidable elements comprising a cylinder and a piston, an actuating rod extending axially of the cylinder and connected with said piston, an expansible sleeve mounted on said piston for frictional engagement with the cylinder, an expander carried by the piston adapted when moved axially in a given direction relative to the piston to expand said sleeve for increasing the pressure of the latter against the cylinder, a spring in said piston in engagement with said expander and adapted to be compressed for moving said expander in said given direction, a seat on said rod and engaged by said spring, means in said cylinder adapted to engage said seat and compress said spring during relative travel in one direction between the cylinder and piston, and sleeve means on said rod within said piston and providing a stop for limiting the extent of compression of said spring.

13. In a shock absorber, a pair of relatively slidable elements comprising a cylinder and a piston, an expansible sleeve mounted on said piston for frictional engagement with the cylinder, an expander carried by the piston adapted when moved axially in a given direction relative to the piston to expand said sleeve for increasing the pressure of the latter against the cylinder, resilient means bearing on said expander for effecting an initial pressure outwardly on the sleeve, further resilient means effective upon relative movement of the piston and cylinder for causing additional loading of the first mentioned resilient means for imparting additional force to the expander tending to expand said sleeve, and stop means for limiting such additional loading of said first mentioned resilient means.

14. In a shock absorber, a cylinder, an expansible unit axially movable in said cylinder and embodying expanding means for holding the unit in initially expanded frictional engagement with the wall of the cylinder, an actuating rod extending axially of the cylinder and connected with said unit, and yieldable means extending inwardly from opposite ends of said cylinder and spaced from opposite sides of said unit during normal operation of the latter but engageable with the expanding means of said unit upon abnormal relative travel of the unit in either direction to cause a further expansion of the unit for increasing the frictional resistance.

15. In a shock absorber, a cylinder, an expansible friction sleeve operable therein, an actuating rod extending axially of said cylinder, expanders on said rod engaging opposite ends of said sleeve, resilient means acting on at least one of the expanders for holding the sleeve in initially expanded frictional engagement with the wall of the cylinder, and spring means in the cylinder on opposite sides of said sleeve and spaced from said expanders during normal operation but engageable with one of said expanders upon abnormal travel of the sleeve in either direction for causing further expansion of the sleeve and increased frictional resistance.

JACOB RUSH SNYDER.